Sept. 6, 1960 R. L. PLOUFFE, JR., ET AL 2,951,905

INSTANTANEOUS TYPE TIME COMPRESSORS AND EXPANDERS FOR PULSE TIME MODULATION TRANSMISSION SYSTEMS

Filed Jan. 3, 1957 3 Sheets-Sheet 1

Inventors
ROBERT L. PLOUFFE, JR.
ROBERT E. HUFNAGEL
By Alfred C. Hill
Agent

Fig. 2
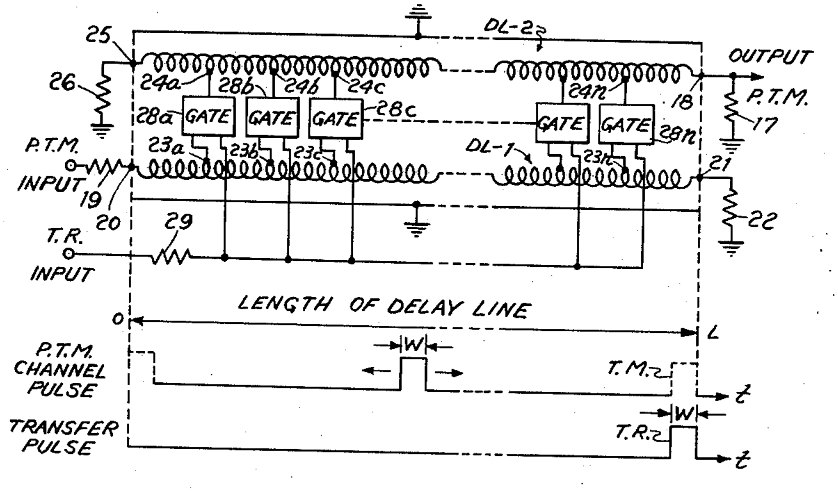
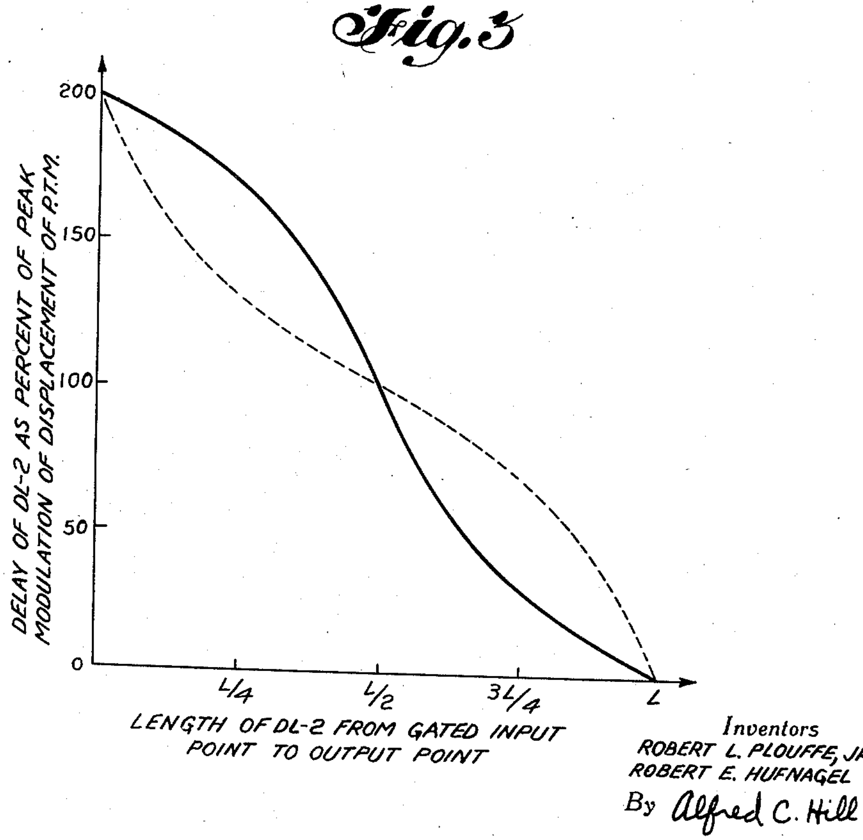
Inventors
ROBERT L. PLOUFFE, JR.
ROBERT E. HUFNAGEL
By Alfred C. Hill
Agent Sept. 6, 1960 R. L. PLOUFFE, JR., ET AL 2,951,905

INSTANTANEOUS TYPE TIME COMPRESSORS AND EXPANDERS FOR PULSE TIME MODULATION TRANSMISSION SYSTEMS

Filed Jan. 3, 1957 3 Sheets-Sheet 3

Inventors
ROBERT L. PLOUFFE, JR.
ROBERT E. HUFNAGEL
By Alfred C. Hill
Agent

United States Patent Office 2,951,905

Patented Sept. 6, 1960

2,951,905

INSTANTANEOUS TYPE TIME COMPRESSORS AND EXPANDERS FOR PULSE TIME MODULATION TRANSMISSION SYSTEMS

Robert L. Plouffe, Jr., Livingston, and Robert E. Hufnagel, Pompton Plains, N.J., assignors to International Telephone and Telegraph Corporation, Nutley, N.J., a corporation of Maryland Filed Jan. 3, 1957, Ser. No. 632,387

20 Claims. (Cl. 179—15)

This invention relates to message transmission systems, and more especially it relates to improved compressors and expanders for such systems of the pulse time modulation kind, hereinafter referred to as PTM systems.

As is well known, for many reasons, it is desirable in certain kinds of transmission systems to employ so-called compandor combinations. Such compandors comprise an amplitude compressor at the transmitter and a complementary expander at the receiver. Various forms of such compandors have been proposed heretofore for different kinds of transmission, for example transmission by amplitude modulation, by frequency modulation, by pulse count modulation, and the like. However, the present invention is directed primarily to a novel and improved instantaneous type compandor for systems employing the principle of pulse time modulation. In such systems the transmission of intelligence is effected by translating the originating audio frequency signals, such for example as voice frequency signals, into sampled time pulses whose time position is changed to represent the wave shape of the audio frequency signal envelope. Such a system is well suited to multiplex transmission since it is possible to interleave the PTM pulses so as to obtain a composite signal for operation over radio frequency transmission links and the like. However, with such PTM systems special problems arise which render the usual compandor arrangement not always satisfactory.

Accordingly, one of the principal objects of this invention is to provide a compressor device and also an expander device which are specially well suited for use in PTM systems.

A feature of the invention relates to an instantaneous type compressor or to an instantaneous type expander wherein the compression or expanding function is controlled by a sweepable substantially inertia-less cathode ray beam, the transfer of the pulses from one time delay line to another time delay line having the desired compression or expansion characteristics, thus providing a minimum attack and decay time.

A further feature relates to a novel instantaneous type compandor for PTM signals employing as the compandor control a novel combination of specially correlated time delay lines with automatic pulse transfer from one line to the other.

Another feature relates to the novel method of compressing or expanding the time deviation of PTM signal pulses by impressing the signal pulses on one delay line having a predetermined time delay per unit length, and automatically and electronically transferring the signal pulses to another delay line having a different time delay per unit length, under control of a recurrent transfer pulse whose recurrence period is correlated with the peak modulation displacement of the PTM signal pulses.

An additional feature relates to a novel combination of delay lines which form part of the beam deflecting system of a cathode ray beam tube, wherein one line serves as a PTM signal input electrode and the other line serves as a PTM output electrode, in conjunction with a keying control grid for the beam, which grid cooperates conjointly with both lines to cause a signal pulse in the input line to set up a signal pulse in the output line with the desired compression and expansion as regards time modulation.

A further feature relates to a novel combination of delay lines of respectively different time delays per unit length, one of which constitutes an input line and the other an output line, in conjunction with a series of pulse controlled coincidence gates interconnecting predetermined taps on the input line with predetermined taps on the output line, for transferring input pulses from one line to the other while effecting the desired time compression in the modulated output PTM pulses.

A still further feature relates to a novel cathode ray tube constituting an instantaneous type compressor or an instantaneous type expander for a multichannel PTM pulse train to be transmitted.

Other features and advantages will appear from the ensuing descriptions, the appended claims, and the attached drawing.

In the drawing, which shows by way of example one preferred embodiment,

Fig. 2 is a composite schematic wiring diagram, pulse distribution diagram, and delay characteristic diagram, explanatory of the dual delay line compressor or expander according to the invention;

Fig. 3 is a graph showing the relation between the delay of the output delay line in terms of peak modulation displacement of the PTM transfer signal pulses, and the point at which the transfer signal pulses are injected into the said line;

Figure 1:
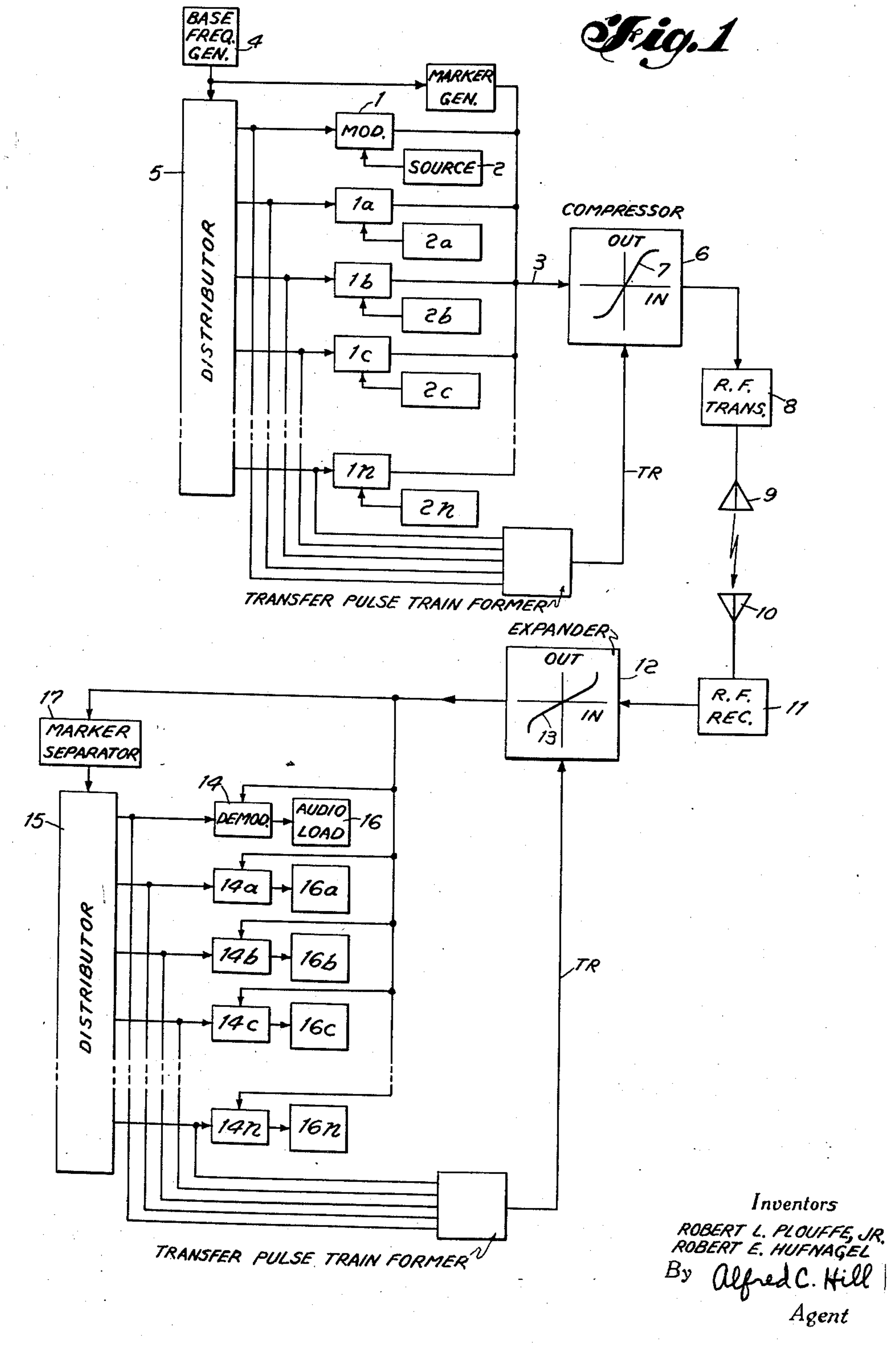
Fig. 1 is a schematic block diagram of a PTM system embodying the compressor and expander units according to the invention.

Referring to Fig. 1, there is disclosed therein a multichannel communication system employing a compressor and an expander in accordance with the invention. The multiplexer end of the system includes a plurality of PTM modulators 1 of any well known kind, such for example as described in U.S. Patent 2,485,591. Each modulator produces a series of pulses representing by their time position the amplitude of the signals of modulating sources 2. The outputs of modulators 1 are coupled to a common point 3 for multiplexing into a PTM pulse train. The time of occurrence of each channel PTM pulse is determined by the base frequency generator 4 and the delay line timing distributor 5. The generator 4 also times the production of a synchronizing or marker pulse repetitious at the frequency of the output of generator 4. Thus, at point 3 the channel PTM pulses are interleaved in time between successive marker pulses to produce a plurality of pulse trains repetitious at the frequency of generator 4. The PTM pulses of each signal channel occupy a given time of the pulse train. This given time is the maximum time deviation of the PTM pulses, said maximum time deviation being proportional to the maximum amplitude of the modulating signal. A guard time may be provided between adjacent channels. The PTM pulse trains are then impressed upon a compressor unit 6 according to the invention, and to be described in connection with Figs. 2–4. For the present, suffice it to say that the unit 6 maintains the time deviation of the PTM pulses at its output within a predetermined time deviation proportional to a given amplitude range. Thus the general characteristic of the compressor 6 has to be such that most of the time deviations proportional to the modulating signal amplitude are concentrated in the early part of the PTM pulse time deviation. One way of doing this is to decrease the time deviation of the successive sampled amplitudes of the modulating signal in such a way that the successive decreased time deviations follow a predetermined characteristic. The curve relating instantaneous input signal time deviation to instantaneous output time deviation of the compressor may be according to any predetermined characteristic, such for example as that represented by the graph 7. The pulses, the time deviation of which has been compressed, are then transmitted over any suitable radio frequency link transmitter 8 of known design, and then impressed upon the transmitting antenna 9.

The signal pulses are picked up by a suitable receiving antenna 10 and are impressed upon any well known radio receiver 11 for detecting the PTM signal pulses. These PTM signals are then passed through an expander 12 which has a characteristic 13 relating instantaneous input time deviation to instantaneous output time deviation, which characteristic is complementary or inverse to the characteristic 7 of the compressor. In other words, the characteristic curve 13 may be considered the same as the characteristic curve 7 but rotated through 180°, the axis of rotation being the straight portion of the curves.

The PTM pulse train containing pulses, the time deviation of which has been expanded, is then coupled to a plurality of any well known demodulators 14. Demodulators 14 under control of the timing pulses of delay line distributor 15 separates its corresponding channel pulse from the pulse train and converts the PTM pulses into intelligence signals. This operation is described in said U.S. Patent 2,485,591 and gives an example of one type of demodulator that may be employed in conjunction with our novel compandor. The outputs of demodulators 14 are coupled to their respective channel loads 16.

The timing of the outputs of distributor 15 is synchronized with the transmitter base frequency generator 4 by the synchronizing or marker signal. This marker signal is detected in marker separator 17 which supplies a synchronized signal to distributor 15 for the appropriate timed distribution to the demodulators 14.

Referring to Fig. 2 there is shown in further detail one preferred form of device which may be used as a PTM instantaneous type compressor or PTM instantaneous type expander. Fig. 2 shows the device connected as a compressor but it can equally well be used as an expander and for convenience of description it will be referred to as a compandor. The compandor comprises two pulse transmission delay lines DL–1, DL–2 of any well known construction, whereby pulses impressed on the input end or input tap of the line are subjected to a predetermined accurate time delay before reaching the output end or output tap of the line. Preferably the line DL–1 is constituted so that it has a uniform delay throughout its length. In other words, its delay characteristic may be considered linear. On the other hand the line DL–2 is designed so that it has a non-uniform delay characteristic throughout its length. In accordance with the invention, the characteristic curve relating the delay between the output point 18 and any point at which the pulses are impressed on line DL–2, is correlated with the compression or expansion of the time deviation desired in the output pulses from the line DL–2. For example, if the compression characteristic is to be according to an exponential law, then the characteristic curve of the line DL–2 is shown in the full line graph of Fig. 3. An examination of that curve shows when a PTM input pulse is applied to various points along the length of the line DL–2, the delay at the terminal 18 is an exponential percentage of the peak time modulation displacement of those input pulses plus a fixed time displacement.

The PTM pulses received from the modulators **1–1*n* (Fig. 1) are impressed as a multiplex train through the resistor 19 to the input terminal 20 of line DL–1. The opposite terminal 21 of line DL–1 is terminated in a suitable resistance 22** representing the characteristic impedance of the line. The time length of lines DL–1 and DL–2 is chosen so that it is equal to the maximum or peak-to-peak time modulation of the input PTM pulses.

Line DL–1 is provided with a multiplicity of taps **23*a*–23*n* located at equal distances along the line. Likewise line DL–2 is provided with a corresponding multiplicity of taps 24*a*–24*n* also equally spaced along that line. The input terminal 25 is connected to ground through a suitable resistor 26 and the output terminal 18 is connected to ground through a resistor 27, so that line DL–2 is terminated in its characteristic impedance. The pulses appearing at terminal 18 comprise the PTM pulses to be transmitted and applied to the radio frequency transmitter 8 (Fig. 1). In order to transfer the received PTM pulses from line DL–1 to line DL–2 to effect the desired compression or expansion, the respective taps on both lines are interconnected by pulse time coincidence gates 28*a*–28*n***. These gates or logical "and" circuits are of any well known kind which require a time coincidence of pulses on a pair of input terminals before a corresponding pulse appears at the output of the gate. These gates preferably are of the diode type but other types, such as a pentode type, may be used.

The coincidence pulse controls for each gate are provided by the pulse applied to each input of a gate from the respective taps on the line DL–1, and by a transfer control pulse TR (see Fig. 2) which is generated at the same recurrence rate as the PTM pulses and applied through resistor 29 to each of the gate inputs. The transfer control pulse train, TR, can be derived from the timing distributor 5 (Fig. 1). The transfer pulse train is obtained by coupling from each output tap of distributor 5 the channel gate pulse for application to transfer pulse train former **5*a* which narrows the channel gate pulses, combines them to be in time sequence, and delays each channel transfer pulse to be in time coincidence with the latest possible time occurrence of the modulated PTM channel signal pulses, which condition is represented in Fig. 2 by the time coincidence between the transfer control pulse TR of one channel and the peak modulated PTM pulse TM of that channel. It is clear, therefore, that for any given time modulation in the PTM signal pulse at terminal 20, there will be only one gate which is opened between the two lines DL–1 and DL–2. Thus, for peak modulation in one direction, the gate 28*n* will be opened and for peak modulation in the opposite direction the gate 28*a*** will be opened.

As an explanatory particular illustration, let it be assumed that the width W of all pulses is equal to the spacing between adjacent taps on line DL–1, although such equality is not absolutely necessary in practicing the invention. Then only one gate will pass a transfer pulse from line DL–1 to line DL–2 each time a channel transfer control pulse TR is applied. In other words, the point along the physical length of the delay lines where the pulse is transferred to line DL–2 is a linear function of the time difference between the transfer control pulse and the PTM signal pulse. This transferred pulse will appear at the output terminal 18 at a time equal to the delay of that portion of line DL–2 between point 18 and the point of entry of the transferred pulse into line DL–2. Since the delay of line DL–2 from the point of entry of the transferred pulse to the output terminal 18 is as shown by the full line graph of Fig. 3, it is apparent that the desired time compression results in the output PTM signal pulses. If the device is to be used as an expander, the line DL–2 is designed to have a reverse characteristic curve as represented by the dotted line graph in Fig. 3.

One of the advantages of the device of Fig. 2 is that it can be used either as a compressor or as an expander without having different delay lines for compression as compared with those for expansion. For example, if the device of Fig. 2 is to be used as an expander, the line DL–2 would be the input line and the line DL–1 would be the output line, it being understood, of course, that the gates 28a–28n are arranged in the opposite direction from those shown in Fig. 2 so as to transfer pulses from line DL–2 to line DL–1.

Furthermore, while in its preferred form the line DL–2 has the gating taps 24a–24n located at equal physical spacings along the length of that line, and the line DL–2 is designed with the required non-uniformity of delay between successive taps, it will be understood that the reverse relation may be employed. Thus the line DL–2 may have a uniform inherent delay versus length characteristic and the taps 24a–24n may be located along the physical length of the line at non-uniformly spaced points representing the desired non-linear function of physical length to give the over-all characteristic represented by the full line graph of Fig. 3. In this embodiment, therefore, both lines DL–1 and DL–2 can have inherent uniform delay versus length characteristics.

Furthermore, while in the foregoing description reference has been made to the fact that the total delay line of each of the two lines is exactly equal to the maximum peak to peak modulation time displacement in the PTM signals, in actual practice that total delay of each line may be made slightly in excess of the said peak to peak modulation displacement. In that case the transfer pulse TR is made to occur at a time corresponding to the fictitious latest possible occurrence of time of the PTM pulse that the line DL–1 is capable of handling.

Figures 4, 5:
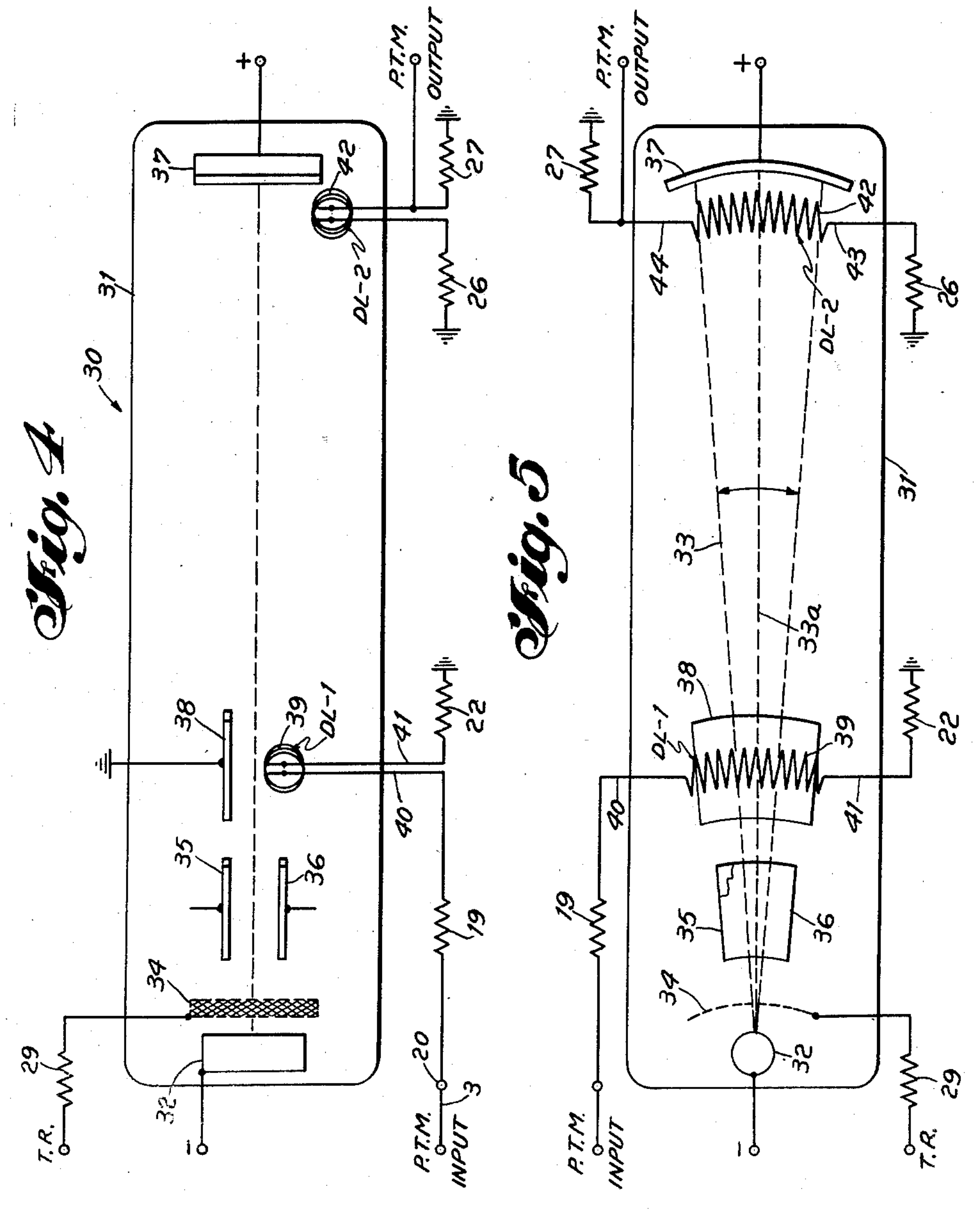
Fig. 4 is a schematic structural diagram of a modification of the compandor shown in Fig. 2, employing a cathode ray tube device for effecting pulse transfer.
Fig. 5 is a view of the tube of Fig. 4, taken at right angles to the view of Fig. 4.

While one typical form of device for effecting the transfer of pulses between the two delay lines has been described, other forms of transfer device may be employed. One such modified form is shown in Figs. 4 and 5. It comprises a cathode ray tube 30 which has a suitable evacuated enclosing bulb 31 wherein are suitably mounted a series of electrodes and beam deflection control elements. Mounted at one end of the bulb is any well known electron emitting cathode 32 for emitting a beam of electrons whose normal trajectory is represented by the dot dash line 33 in Fig. 4. The beam passes through a suitable control grid 34 to which is applied the transfer control pulse TR above described. Normally the grid 34 is biased to beam cut-off so that the beam does not reach the remaining electrodes until a transfer control pulse is applied to the grid.

Mounted in the path of the beam are a pair of spaced metal plates 35, 36 suitably charged to focus the cathode ray beam into a sheet-like formation with the plane of the sheet-beam being parallel to the plates 35 and 36, that is, normal to the plane of the sheet of the drawing as seen in Fig. 4, and parallel to the plane of the sheet of the drawing as seen in Fig. 5. Normally the entire focused beam when keyed on and in the absence of any PTM pulses, follows a substantially axial undeflected trajectory along the length of the tube and impinges upon the positively charged collector plate 37 located at the opposite end of the tube. Mounted adjacent the focus plates 35, 36 are a pair of beam-deflecting elements comprising a grounded metal plate 38 and a wave delay line 39 which constitutes the delay line DL–1 of Fig. 2. Line 39 is provided at its opposite ends with lead-in connections 40, 41 for connection to the resistors 19 and 22 as described above in connection with Fig. 2. Therefore, the elements 38 and 39 by their conjoint action provide the equivalent of a deflecting gate of elemental width, which gate moves along the length of line 39. In other words, because the potential at all points along the line 39 is zero except at the position on line 39 corresponding to the position of the input PTM pulse thereon, the entire width of the electron sheet beam will remain undeflected between elements 38 and 39 except at a position determined by the relative time position between the TR pulse and the PTM pulse. In the absence of a PTM pulse the entire width of the sheet beam will remain undeflected and will strike the collector 37. However, with a PTM pulse an elemental deflected portion 33a of that beam corresponding to the position of the PTM pulse in line 39 will be deflected downwardly so as to strike another wave delay line 42. The position of intercept between this deflected elemental portion of the beam and the line 42 will, of course, depend upon the relative time between the pulse when entering line 39 and the transfer pulse TR on grid 34. The net result is that the elemental portion of the beam will impinge upon the line 42 at a point corresponding to the location of the pulse in line 39, thus setting up a corresponding pulse in line 42. Line 42 is mounted in front of and axially offset with relation to one edge of collector 37 and is provided with respective lead-ins 43, 44 for connection to the resistors 26, 27 as above described. Line 42, therefore, constitutes the second delay line DL–2 of Fig. 2 in which a pulse is induced only when an elemental portion of the beam is deflected. It is clear, therefore, that by designing the lines 39 and 42 with the appropriate delay characteristics as above described for lines DL–1 and DL–2, the desired compression in the output pulses develop across resistor 27 and is obtained. When the tube of Figs. 4 and 5 is to be used as an expander, the delay lines 39 and 42 will be provided with opposite characteristics to those required for compression.

While in the foregoing two different methods are employed to transfer the PTM pulses from one delay line to another, other equivalent methods may be employed.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for compression of the time deviation of pulse time modulation pulses comprising a source of time modulated pulses, a first delay line, means to couple said pulses to said first line, means to generate a transfer control pulse of predetermined fixed timing correlated with the maximum peak-to-peak time position modulation of said pulses, a second delay line, means to induce in said second line a pulse whose insertion position in said second line is determined by the relative time position between the time modulated pulses in said first line and said transfer control pulse.

2. A system for expansion of the time deviation of pulse time modulation pulses comprising a source of time modulated pulses, a first delay line, means to couple said pulses to said first line, means to generate a transfer control pulse of predetermined fixed timing correlated with the maximum peak-to-peak time position of said pulses, a second delay line, means to induce in said second line a pulse whose insertion postion in said second line is determined by the relative time position between the time modulated pulses in said first line and said transfer control pulse.

3. A communication system for pulse time modulation pulses comprising a transmitter having a source of time modulated pulses, a first delay line, means to couple said pulses to said first line, means to generate a first transfer control pulse of predetermined fixed timing correlated with the peak-to-peak time position modulation of said pulses, a second delay line, means to induce in said second delay line another pulse whose insertion position in said second line is determined by the relative time position between the time modulated pulses in said first line and said transfer control pulse to produce corresponding output pulses from said second line with the desired compression of the time deviation of said pulses, and means to transmit said time compressed pulses, and a receiver having a means to receive said time compressed pulses, a third delay line, means coupling the output of said receiving means to said third delay line, means to generate a second transfer control pulse of predetermined fixed timing correlated with the peak-to-peak time position modulation of said time compressed pulses, a fourth delay line, means to induce in said fourth delay line another pulse whose insertion position in that line is determined by the relative time position between the compressed time modulated pulses in said third line and said second transfer pulse to produce at the output of said fourth line pulse time modulation pulses the time deviation of which has been expanded to complement said compression at said transmitter.

4. A system for controlling the time position of time modulated pulses comprising a source of time modulated pulses, a first delay line, means coupling said pulses to said first delay line for propagation therealong, means to generate a transfer control pulse of fixed timing correlated with the maximum peak-to-peak time position modulation of said peaked pulse time modulation pulses, a second delay line, and means to gate a pulse into said second delay line at a point of insertion determined by the location of the pulse time modulated pulses in the first line relative to the time position of said transfer control pulse, said second line having a delay characteristic to subject said inserted pulse to a predetermined delay to produce at the output of said second line a pulse time modulated pulse having the desired time position modulation compression or expansion.

5. A delay device for modifying the time position of a time modulated pulse for pulse time modulation systems and the like comprising first and second delay lines, means to transmit pulse time modulation pulses through the first line, means to generate a transfer control pulse having a predetermined fixed timing with respect to the maximum peak to peak time position modulation of said pulse time modulation pulses, means responsive to the relative time position of a pulse time modulation pulse transmitted through said first line and said transfer control pulse to set up a pulse in the second line at a position of insertion whereby the said pulse in the second line is subjected to a different delay than the pulse time modulation pulse in the first line, which delay is correlated with the desired compression or expansion in the time position modulation of the pulse time modulation pulses.

6. A delay device according to claim 5, in which the means responsive to said relative time position of said pulse time modulation pulse and said transfer control pulse to set up a pulse in the second line includes a plurality of normally closed gates interconnecting successive tap-off points in the first line with successive pulse insertion points on the second line.

7. A delay device according to claim 5, in which the means responsive to said relative time position of the pulse time modulation pulse and the transfer control pulse to set up a pulse in the second line includes means to develop a beam of electrons, means including the first line to deflect an elemental portion of said beam into intercepting relation with the second line, the point of said interception being determined by the said time coincidence.

8. A delay device for modifying the time position of time modulated pulses for pulse time modulation systems and the like comprising first and second delay lines, means to transmit the pulse time modulation pulses through the first line, means to generate a transfer control pulse, a plurality of normally closed pulse gates each connecting a successive point on the first line with a corresponding successive point on the second line, means responsive to the relative time position of a pulse time modulation pulse in the first line and the transfer control pulse at any gate to open that gate to transfer a pulse to the corresponding point of the second line, whereby said transferred pulse is subjected to a different delay as compared with the delay of the pulse time modulation pulse in the first line.

9. A delay device according to claim 8, in which said first line has a wave delay per unit length characteristic which is substantially linear, and said second line has a wave delay per unit length characteristic which is non-linear.

10. A delay device according to claim 8, in which said successive points on the first and second lines are equally spaced therealong.

11. A delay device according to claim 8, in which said successive points on the first line are equally spaced therealong and the successive points on the second line are unequally spaced therealong.

12. A delay device according to claim 8, in which each of said lines has a length which is correlated with the maximum peak to peak time position modulation in the pulse time modulation pulses.

13. A delay device according to claim 8, in which said transfer control pulse occurs in time coincidence with the occurrence of the maximum latest time position modulation in the pulse time modulation pulses in the first line.

14. A delay device for modifying the time deviation of time modulated pulses for pulse time modulation systems and the like comprising a pair of pulse delay lines, means to impress an input pulse time modulation pulse on an input terminal of the first line, said second line having a plurality of pulse insertion terminals and a pulse output terminal, a plurality of transfer points distributed along the length of the first line and connected to respective insertion points of the second line, a plurality of coincidence gating means, there being one gating means connected between each transfer point on the first line and a corresponding insertion point on the second line, means to impress on the input of all the gates a transfer control pulse of fixed timing correlated with the extent of time position modulation in the pulse time modulation pulses, each of said gates being responsive to time coincidence of a pulse time modulation pulse in the first line and said transfer control pulse to insert into the second line a pulse time modulation pulse at a corresponding insertion point determined by said time coincidence, to produce at the output terminal of said second line pulse time modulation pulses, the time deviations of which have the desired compression or expansion.

15. A delay device for modifying the time position of time modulated pulses for pulse time modulation systems and the like comprising a cathode ray tube having means to develop an electron beam with a normal trajectory, an electron collector upon which the beam impinges at the end of its normal trajectory, means including a pulse delay line for deflecting said beam away from its normal trajectory, a second delay line upon which the beam impinges when deflected by the first line, means to apply a pulse time modulation pulse to said first line to produce a beam deflecting field which progresses along the first line in accordance with the position of the pulse time modulation pulse therealong, to cause the deflected beam to induce in the second line a corresponding pulse time modulation pulse at a point of insertion in the second line determined by the position of said deflecting field as it is progressing along the first line.

16. A delay device for modifying the time position of time modulated pulses for pulse time modulation systems and the like comprising a cathode ray tube having means to develop a sheet-like electron beam, a collector electrode upon which said beam impinges when undeflected, a pulse time modulation pulse output electrode upon which said beam impinges when deflected, said output electrode being in the form of a delay line, deflection means for the beam and including a deflector electrode in the form of a delay line, a control grid, means for applying a transfer control pulse to said grid for keying said beam on and off at a fixed timing correlated with the extent of time position modulation in the pulse time modulation pulses, lead-in means for the second-mentioned line for applying input pulse time modulation pulses thereto, and for setting up a localized beam deflecting potential whose location along said second-mentioned line is determined by the relative time position between said transfer control pulse and said input pulse time modulation pulse, said localized deflecting potential deflecting a corresponding elemental portion of said sheet-like beam, and means including said deflected beam and said first-mentioned line for inducing a pulse time modulation pulse in said first-mentioned line at a point of insertion determined by the location of said beam-deflecting potential on the second-mentioned line.

17. A delay device according to claim 16, in which the second-mentioned line has a delay characteristic which is different from the delay characteristic of the first-mentioned line.

18. A device for modifying the time position of time modulated pulses, for multichannel pulse time modulation signals having a synchronizing signal and a plurality of channel signals, comprising a first delay line, means to transmit through said line pulse time modulation pulses, a second delay line, means to derive from said synchronizing signals a pulse transfer signal, and means including said pulse transfer signal for transferring a pulse time modulation pulse from the first line to the second line for producing at the output of the second line pulse time modulation pulses with the desired modification of their time position.

19. A pulse delay control device, comprising a cathode ray tube having means to develop a sheet-like beam of electrons, means including a first delay line for setting up a beam deflecting potential which is selectively movable across the width of the beam under control of input pulses applied to said line, a second delay line offset from the normal undeflected trajectory of said beam and located so as to intercept the portion of the beam deflected by said potential, and lead-in means for connecting said second line to a pulse output utilization circuit, said second line having a pulse selectively induced therein at any point along its length to correspond with the location of said beam deflecting potential along the first line.

20. A pulse delay control device according to claim 19, in which one of said lines has a predetermined delay-length characteristic which is different from the delay-length characteristic of the other line.

References Cited in the file of this patent

UNITED STATES PATENTS

| | | |
|---|---|---|
| 2,189,898 | Hartley | Feb. 13, 1940 |
| 2,219,021 | Riesz | Oct. 22, 1940 |
| 2,768,352 | Von Sivers et al. | Oct. 23, 1956 |
| 2,795,650 | Levine | June 11, 1957 |